Feb. 27, 1968 TAKEZO TAKADA 3,370,329
BUCKLE DEVICE
Filed March 31, 1966 4 Sheets-Sheet 1

INVENTOR
Takezo Takada

BY

Michael S. Striker
ATTORNEY

INVENTOR
Takezo Takada

BY

Michael J. Parker
ATTORNEY

Feb. 27, 1968 TAKEZO TAKADA 3,370,329

BUCKLE DEVICE

Filed March 31, 1966 4 Sheets-Sheet 3

INVENTOR
Takezo Takada

BY

Michael S. Striker
ATTORNEY

INVENTOR
Takezo Takada

BY

Michael S. Striker
ATTORNEY

United States Patent Office 3,370,329
Patented Feb. 27, 1968

3,370,329

BUCKLE DEVICE

Takezo Takada, 1741 Hikotomi, Inaemachi, Echi-gun, Shiga-ken, Japan

Filed Mar. 31, 1966, Ser. No. 539,146
Claims priority, application Japan, Apr. 12, 1965, 40/28,435; Nov. 19, 1965, 40/94,206; Nov. 30, 1965, 40/97,268
4 Claims. (Cl. 24—230)

ABSTRACT OF THE DISCLOSURE

A buckle device for a safety belt in which a guide member slidably mounted on a base member forms with the latter a gap receiving an insert to which one end of the belt is fastened and including a lever pivotally mounted on the guide member and cooperating with the roller means for maintaining the insert in the gap in one position of the lever and for releasing the insert in another position of the lever.

This invention relates to locking devices and has particular reference to buckles for use with safety belts worn by passengers aboard aircraft and the like.

There have been introduced belt or band buckles of the various types designed to protect the aircraft passengers or automobile riders against bodily shock or otherwise safeguard their lives against traffic accidents.

However, none of these prior-art devices are altogether satisfactory as they are structurally frail, sluggish in handling, too easy to unlock and susceptible to wear when subjected to frequent engaging and disengaging operations of the buckle locking elements. Moreover, the safety buckles of the known type are disadvantageously complicated and hence costly.

Whereas, it is the primary object of the present invention to provide improved buckle devices for use with safety belts which will eliminate the above-noted difficulties of the prior-art devices.

It is another object of the present invention to provide buckle devices of the unique construction designed to assure smooth, trouble-free engagement of the locking elements and hold wear thereof to a minimum.

These objects and advantages of the present invention will become apparent from the following description taken in conjunction with the accompanying drawings in which.

Figure 1:
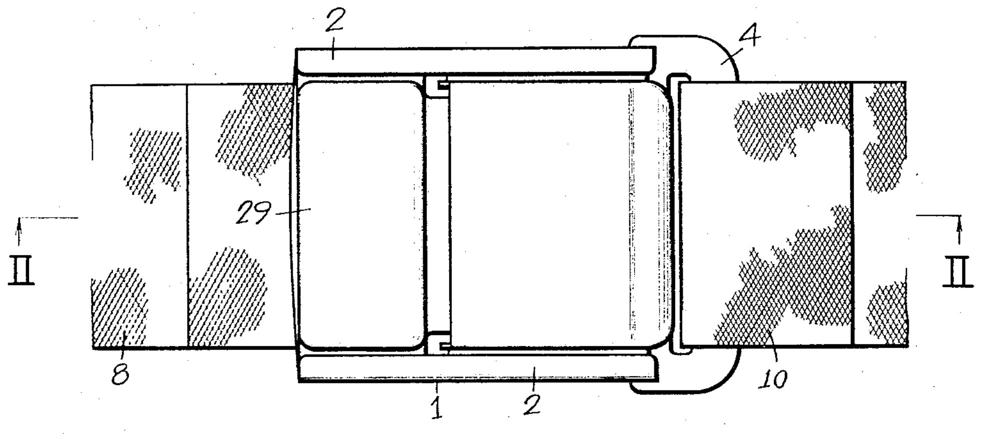
FIG. 1 is a plan view of the buckle device embodying the invention.
Figure 2:
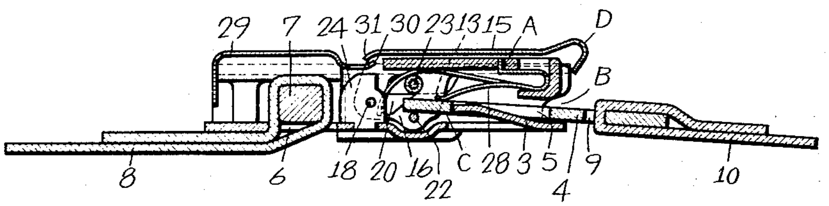
FIG. 2 is a cross-sectional view of the buckle device taken on the line II—II of FIG. 1 with its handle lever held in closed position.
Figure 5:
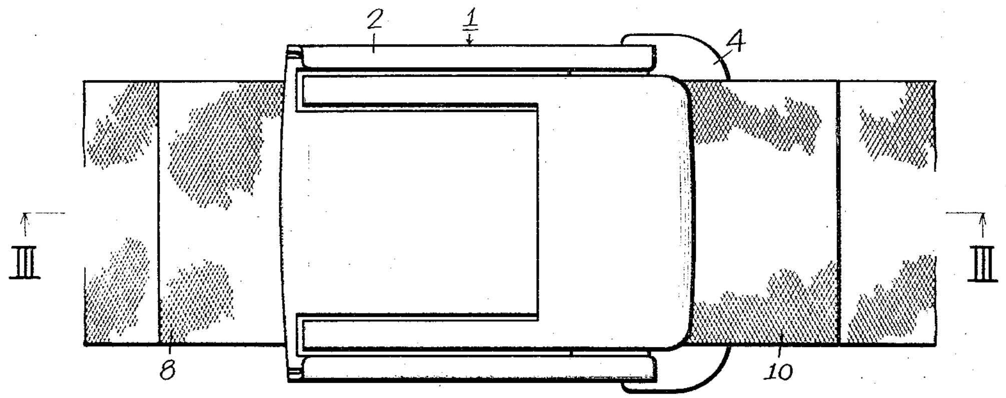
Figure 6:
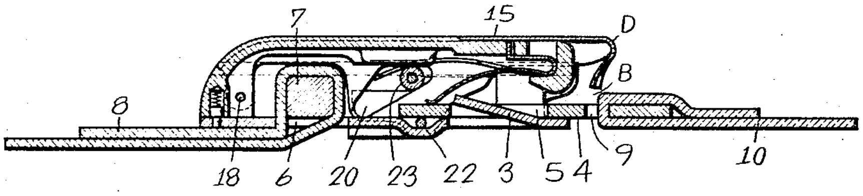
Figure 7:
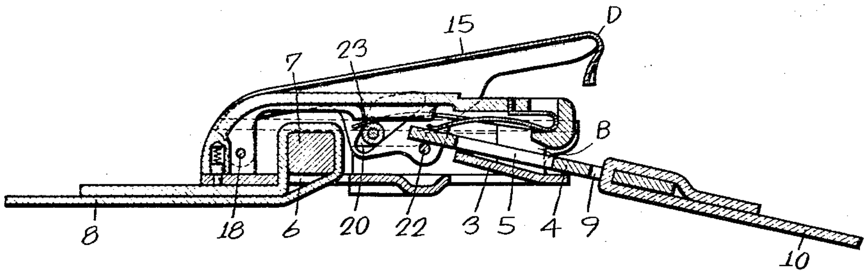
Figure 8A:
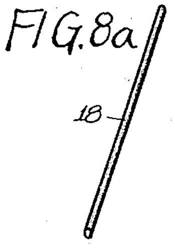
Figure 8B:
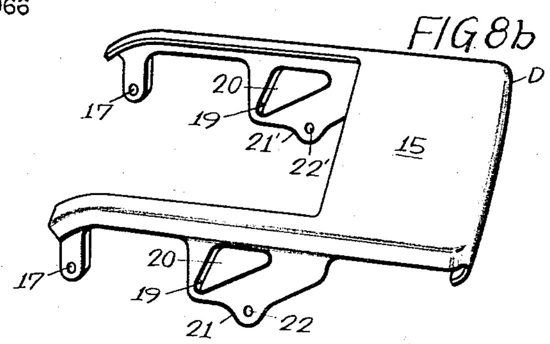
Figure 8C:
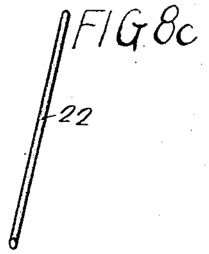
Figure 8D:
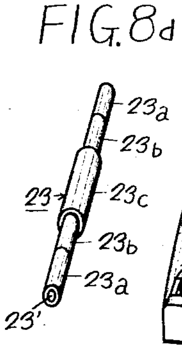
Figure 8E:
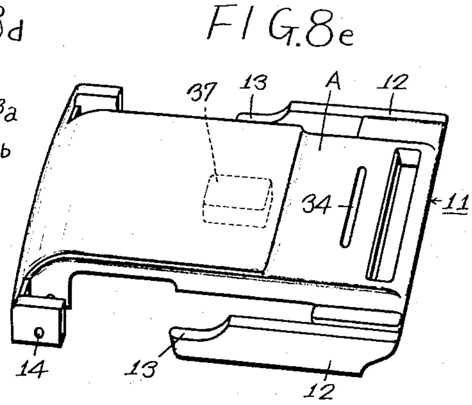
Figure 8F:
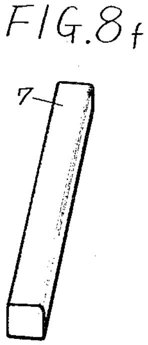
Figure 8G:
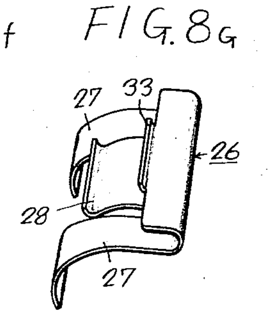
Figures 8H, 8I:
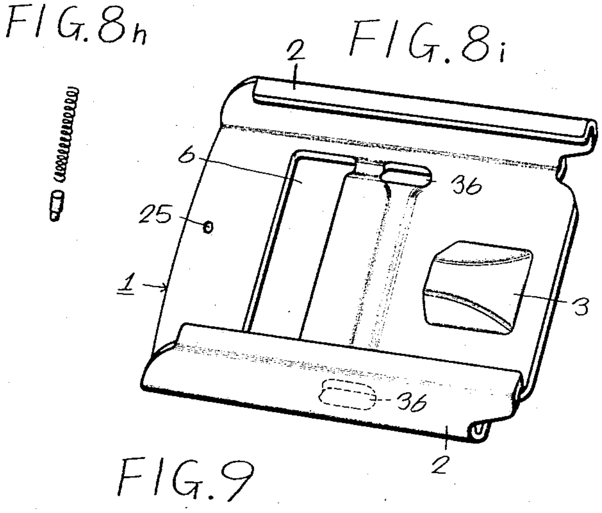
Figure 8I:
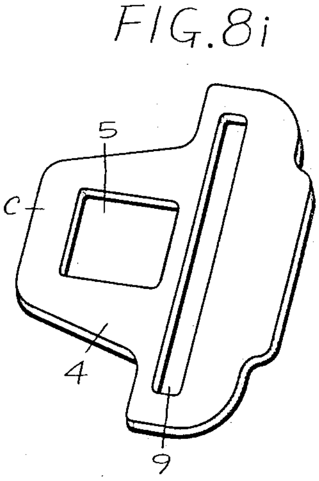
Figure 9:
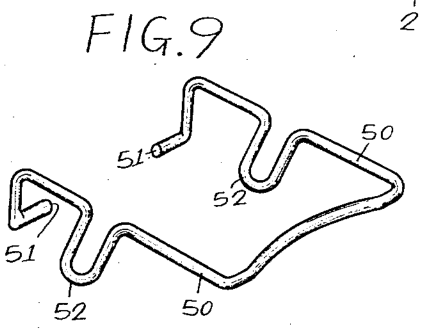

FIGS. 4–*a* through 4–*j*, inclusive, show all individual component parts of the buckle of FIG. 1;

FIG. 5 is a plan view of another embodiment of the invention;

FIG. 6 is a cross-sectional view of the buckle device taken on the line III—III of FIG. 5 with the handle lever held in closed position;

FIG. 7 is a similar cross-sectional view with the handle lever held in raised position;

FIGS. 8–*a* through 8–*j*, inclusive, show all individual component parts of the buckle of FIG. 5; and FIG. 9 shows a modification of the handle lever of the buckle according to the invention.

Like numerals refer to like and corresponding parts throughout the drawings.

FIGS. 1–4 illustrate a first embodiment of the invention which comprises an assembly of the various components and elements separately shown in FIGS. 4–*a* through 4–*j*.

This buckle device comprises a base member 1 (shown at FIG. 4–*i*) having a guide channel 2 on each side and a protuberance or mound 3 near one end for locking engagement with a square hole 5 in an inserter 4 (shown at FIG. 4–*j*).

The base member 1 is further provided with an opening 6 for passing one end 8 of the belt therethrough and retaining the belt in place with a square rod 7 (shown at FIG. 4–*c*). The inserter 4 is also provided with a similar opening 9 for passing the other end 10 of the belt and retaining the same in place in the usual manner.

The base member is adapted to engage a guide member 11 (shown at FIG. 4–*f*), for which purpose the latter is provided at each side with a stepped portion or wing 12 for slidable engagement with the channels 2 of the base member 1. With the guide member 11 thus mounted in the base member 1, there is formed a gap B in between the reverse side of the main part A of the guide member 11 and the upper side of the base member 1.

Each wing 12 of the guide member 11 is recessed at 13 and provided at an extended end thereof with a hole 14.

Figure 4A:
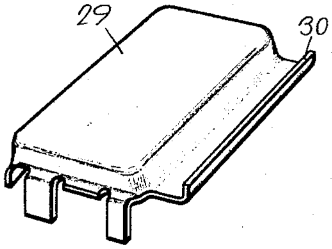
Figure 4B:
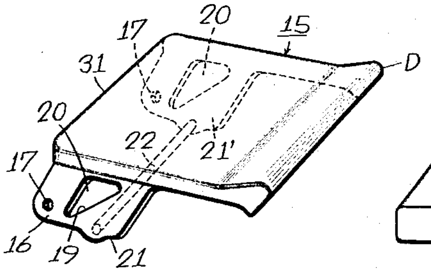
Figure 4C:
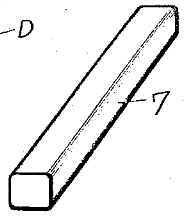
Figure 4D:
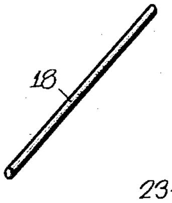
Figure 4E:
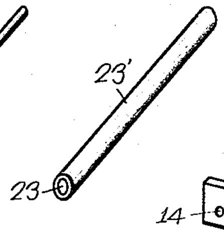
Figure 4F:
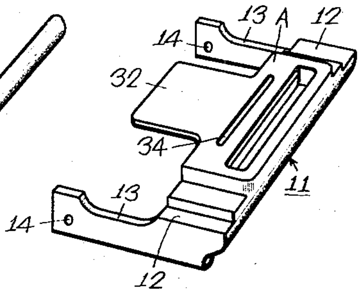
Figure 4G:
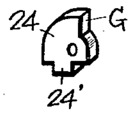
Figure 4H:
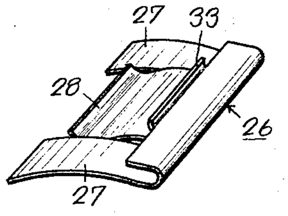
Figure 4I:
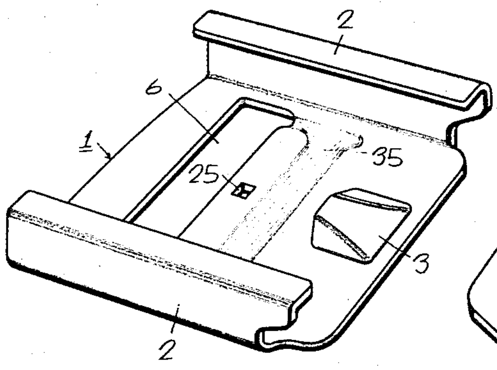
Figure 4J:
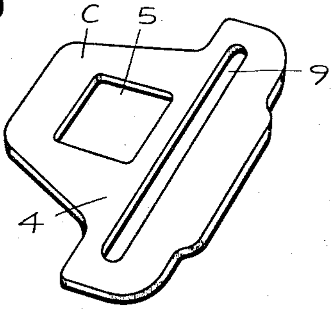

FIG. 4*b* shows a handle lever 15 which is adapted to fit over the guide member 11 and which has on each side an ear-like part 16 with a hole 17. These holes 17 and the holes 14 in the wings 12 are in registry and connected by a pin 18 (shown at FIG. 4–*d*) thereby bringing the handle lever 15 into pivotal engagement with the guide member 11.

Each ear 16 integrally formed with the lever 15 is provided with a cam hole 20 having a linear portion 16 assuming a predetermined angle with respect to the plane of the base member 1 and with a projection 21 extending downwardly into a recess 35 of the guide member 11. Opposite ears 16 of the lever 15 are connected by a pin or roll 22 (shown in dotted line at FIG. 4–*b*) pivotally attached to the lower part thereof.

There is provided a roller 23 having loosely fitted thereover a sleeve 23' made of nylon or similar material. This roller (shown at FIG. 4–*e*) is rotatably mounted on the recesses 13 of the guide member 11 and inserted through the cam hole 20 in the handle lever 15, extending into the side channels 2 of the base member 1.

The pin 18 connecting the guide member 11 with the handle lever 15 has inserted centrally therethrough positioner 24 having a bottom part 24' adapted to fit into a positioning hole 25 in the center part of the base member 1 whereby the guide member 11 and the handle lever 15 are retained fixedly in position with respect to the base member 1. The positioner 24 has a vertical face G for limiting the displacement of the roller 23.

A spring member 26 (shown at FIG. 4–*h*) is adapted to be mounted on the main part A of the guide member 11, for which purpose the spring is provided with an uprise 33 to fit into a slit 34 in the main part A, and has an arcuate down-facing wing 27 on each side to rest over the roller 23 and a central up-facing tongue 28 to overlie the mound 3 of the base member 11.

Shown at FIG. 4–*a* is a cover member 29 which engages at their sides with the channels 2 of the base member 1 and which has an up-rise 30 to hook with a downwardly bent end 31 of the handle lever 15.

The guide member 11, as shown at FIG. 4–*f*, is further provided centrally with a square projection 32 for preventing the roller 23 from being excessively flexed when a force is exerted to lift the tip end C of the inserter 4 while inserted in place.

The central part 28 of the spring member 26 is adapted to retain the tip end C of the inserter 4 resiliently in place when the latter is inserted through the gap B between the base member 1 and the guide member 11, in which instance the tip end C is held in position at between the fixed roll 22 and the rotatable roller 23 which is urged downwardly by the side wings 27 of the spring member 26.

With this construction, the buckle for safety device according to the invention may be handled with ease and assurance. When locking the buckle, the belt inserter 4 is inserted through the gap G formed between the base member 1 and the guide member 11 with its tip end C slid into the base member 1 against tension of the spring member 26, until the square hole 5 is brought into locking engagement with the square mound 3 of the base member 1. In this locked position of the buckle, the tip end C of the inserter 4 is positioned in between the two rolls 22 and 23 and so retained in place by the downward tension of the center tongue 28 of the spring member 26, as seen from FIG. 2.

Such pair of rolls according to the invention will limit the upward displacement of the inserter 4 and further prevent the same from being unlocked from the base member 1 which would otherwise occur if an external force greater than the tensile force of the spring 26 is exerted to the belt.

Figure 3:
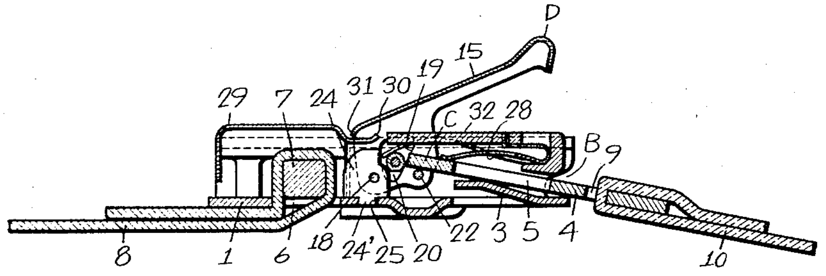
FIG. 3 is a similar cross-sectional view with the handle lever held in raised position.

When unlocking the buckle, the handle lever 15 is rotated about the pin 18 in the direction of arrow as shown in FIG. 3 by applying upward finger pressure to the rounded end D of the lever. In this instance, the sleeved roller 23 is caused to displace downwardly along the guide slope 19 of the cam hole 20 and rolled over the recesses 13 in the guide member 11 until it releases the tip end C of the belt inserted 4. At the same time, the slender roll 22 moves up arcuately about the pin 18 thereby forcing the tip end C up against tension of the center arcuate strip 28 of the spring 26, until the hole 5 in the inserter 4 is released from the hook 3 on the base member 1.

The extent to which the handle lever 15 is raised to unlock the buckle is defined by the limiting face G of the positioner 24 which limits the downward displacement of the sleeved roll 23.

In one preferred embodiment of the invention just described, it will be appreciated that since the rotatable pin 18 is disposed substantially in the center of the base member 1 and close to the cam hole 20 and the lower roll 22, it requires a relatively large angular movement of the handle lever 15 to achieve such displacement of the cam hole 20 and roll 22 as is necessary to release the inserter 4 from the base member 1. This means that the buckle can be held from being unlocked too easily or unattendedly even when the handle lever 15 is caught and pulled, for instance, by the coat of the wearer or when it is plugged with foreign matters, unless the handle lever is positively rotated upwardly to the predetermined position.

As the lower roll 22 is secured fixedly or pivotably to the ear portions 16 of the handle lever 15, these components can be held rugged as a whole.

One advantage of the above buckle device embodying the invention it that it is built with relatively simple component parts which can be readily put together with minimum effort and retained in their respective position simply by means of the positioning block 24.

Reference now is had to FIGS. 5 through 8 illustrating another embodiment of the invention which comprises essentially the same component parts as those incorporated in the afore-described first embodiment, except for certain modifications. These modifications and changes made in the second embodiment are intended to improve the structural and functional aspects of the first embodiment which are desirous of a belt buckle device of this type for safety purposes.

The base member 1 is adapted to receive the guide member 11 thereinto as the side wings 12 of the latter are slid through the corresponding guide channels 2 of the former, leaving a gap B for the insertion of the belt inserter 4.

The guide member 11 is provided at one end with holes 14 which register with holes 17 in the handle lever 15, these corresponding holes being connected by a pin 18 thereby bringing the handle lever 15 into pivotal engagement with the guide member 11.

Each ear part 16 of the handle lever 15 is provided with a cam 20 for the purpose already stated in connection with the first embodiment and with a projection 21 extending downwardly through an oval hole 36. The ear 16 is further provided with a hole 22′ near the projection 21 for inserting therethrough a lower pin or roll 22. This roll serves to lift the tip end C of the inserter 4 when the handle lever 15 is raised to release the inserter 4 from the base member 1.

The upper roller 23 is inserted through the cam hole 20 and rotatably rides on the recessed part 13 of the guide member 11. This roller 23 in this buckle device comprises a core of steel 23′ having rotatably mounted thereon a plurality of roll sleeves 23*a*–23*c* made of nylon or similar material having a low friction factor.

As the handle lever 15 is lifted as shown in FIG. 7, the upper sleeved roller 23 moves upwardly along the recess 13 and along the slope 19 of the cam hole 20. In this instance, the center sleeve 23*c* abuts against a dented part 37 of the guide member 11 and against the tip end C of the inserter 4. This imparts a tendency to the core or steel roller 23′ to rotate counter-clockwise. On the other hand, the first pair of sleeves 23*b* in contact with the arcuate strips 27 of the spring 26 imparts a tendency to the core 23′ to rotate clockwise, while the second pair of sleeves 23*a* in contact with the guide recess 13 imparts a tendency to the core 23′ to rotate counter-clockwise. In this manner, the frictional forces applied to the sleeved roll 23 at the time of its displacement cancel each other out, so that the roll 23 moves smoothly with movement of the handle lever 15.

For retaining the whole buckle assembly in place, there is provided a coil spring 38 with one end thereof inserted in a slot 40 in the extreme end of the guide member 11 and with the other end seated on a retaining post 41 which fits into the hole 25 in the base member 1. This retaining arrangement corresponds in function to the positioning block 24 illustrated at FIG. 4–*g*.

The second embodiment above described operates substantially in the same manner as the first embodiment, except that the use of sleeve members 23*a*–23*c* eliminates more positively the frictional loss of the various contact parts encountered in the frequent handling of the lever 15.

FIG. 9 illustrates a modification of the handle lever 15. This handle 50 is fabricated with a single piece of wire or rod whose ends are so formed as to serve as a pivotal pin 51 and which has a U-bend 52 on each side designed to function in a manner similar to the cam hole 20.

While the above constitutes a few embodiments of the invention, it is to be understood that the invention is not limited to this precise form of apparatus and that changes may be made therein without departing from the scope of the invention which is defined in the appended claims.

What is claimed is:

1. A buckle device for safety belt comprising a base member having a locking means for locking engagement with a belt inserter, a guide member for slidable engagement with said base member, a handle lever for pivotal engagement with said guide member, a spring member inserted in between said guide member and said handle lever and adapted to normally urge the tip end of said belt inserter toward the base member, a pair of rollers one of which is inserted in a cam hole provided in said handle lever and adapted to normally hold the belt inserter from being released from the base member, while the other is secured to the handle lever and adapted to lift the tip end of the belt inserter when the handle lever is raised, and a positioning block adapted to retain the whole buckle assembly in place.

2. A buckle device for safety belt comprising a base member having a locking means for locking engagement with a belt inserter, a guide member for slidable engagement with said base member, a handle lever for pivotal engagement with said guide member, a spring member inserted in between said guide member and said handle lever and adapted to normally urge the tip end of said inserted toward the base member, a pair of rollers one of which is inserted in a cam hole provided in said handle lever and adapted to normally hold the belt inserter from being released from the base member, while the other is secured to the handle lever and adapted to lift the tip end of the belt inserter when the handle lever is raised, said first roller having rotatably inserted thereover a sleeve.

3. A buckle device for safety belt comprising a base member having a locking means for locking engagement with a belt inserter, a guide member for slidable engagement with said base member, a handle lever for pivotal engagement with said guide member, a spring member inserted in between said guide member and said handle lever and adapted to normally urge the tip end of said belt inserter toward the base member, an upper roll inserted in a cam hole provided in said handle lever and adapted to normally hold the belt inserter from being released from the base member, a lower roll pivotally connected to the handle lever and adapted to lift the tip end of the belt inserted when the handle lever is raised, said upper roll having rotatably inserted thereover a plurality of roll sleeves whereby the frictional forces applied to the upper roll cancel each other out, and a coil spring adapted to retain the whole buckle assembly in place.

4. The buckle device as defined in claim 4 wherein said plurality of roll sleeves are made of low friction material such as nylon and the like.

References Cited

UNITED STATES PATENTS 3,145,442 8/1964 Brown.

FOREIGN PATENTS 1,340,076 9/1963 France.
1,385,512 12/1964 France.

BERNARD A. GELAK, *Primary Examiner.*